(12) United States Patent
Basmaji et al.

(10) Patent No.: US 8,776,764 B2
(45) Date of Patent: Jul. 15, 2014

(54) FUEL SYSTEM FOR A MULTI-FUEL ENGINE

(75) Inventors: Joseph Basmaji, Waterford, MI (US); Gopichandra Surnilla, West Bloomfield, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 546 days.

(21) Appl. No.: 12/984,538

(22) Filed: Jan. 4, 2011

(65) Prior Publication Data

US 2012/0167859 A1 Jul. 5, 2012

(51) Int. Cl.
F02M 37/04 (2006.01)
(52) U.S. Cl.
USPC ........ 123/495; 123/446; 123/504; 123/27 GE
(58) Field of Classification Search
USPC ............. 123/1 A, 27 GE, 525, 527, 575, 304, 123/446, 447, 456, 457, 477, 495, 494, 497, 123/504
See application file for complete search history.

(56) References Cited

U.S. PATENT DOCUMENTS

| | | | | |
|---|---|---|---|---|
| 5,230,613 | A * | 7/1993 | Hilsbos et al. | 417/439 |
| 5,755,211 | A * | 5/1998 | Koch | 123/525 |
| 5,884,597 | A * | 3/1999 | Hiraku et al. | 123/179.17 |
| 6,230,688 | B1 | 5/2001 | Faix et al. | |
| 6,378,489 | B1 * | 4/2002 | Stanglmaier et al. | 123/304 |
| 6,408,822 | B1 * | 6/2002 | Rembold et al. | 123/447 |
| 6,439,202 | B1 * | 8/2002 | Carroll et al. | 123/467 |
| 6,742,479 | B2 | 6/2004 | Yanagisawa | |
| 6,748,923 | B2 | 6/2004 | Grossner et al. | |
| 6,988,492 | B2 * | 1/2006 | Shetley | 123/525 |
| 6,990,958 | B2 * | 1/2006 | Asano et al. | 123/436 |
| 7,013,872 | B2 * | 3/2006 | Yamazaki et al. | 123/431 |
| 7,347,186 | B2 | 3/2008 | Ricco et al. | |
| 7,377,753 | B2 | 5/2008 | Kuroda | |
| 7,584,747 | B1 * | 9/2009 | Ibrahim et al. | 123/456 |
| 7,640,916 | B2 * | 1/2010 | Ulrey et al. | 123/446 |
| 7,770,562 | B2 | 8/2010 | Pursifull et al. | |
| 7,814,887 | B2 * | 10/2010 | Cwielong et al. | 123/456 |

(Continued)

FOREIGN PATENT DOCUMENTS

EP 1355059 A2 10/2003

OTHER PUBLICATIONS

Surnilla, Gopichandra et al., "Fuel System for a Multi-Fuel Engine," U.S. Appl. No. 12/862,316, filed Aug. 24, 2010, 51 pages.

*Primary Examiner* — John T. Kwon
*Assistant Examiner* — Johnny Hoang
(74) *Attorney, Agent, or Firm* — Julia Voutyras; Alleman Hall McCoy Russell & Tuttle LLP

(57) ABSTRACT

Methods and systems are provided for operating an engine fuel system including a low pressure pump and a high pressure pump. During conditions when direct injection is not requested, a fuel rail pressure is maintained by the low pressure pump and fuel is port injected. Further, a stroke amount of the high pressure pump is adjusted to maintain an outlet pressure of the high pressure pump just below the fuel rail pressure. By maintaining fuel flow within the high pressure pump when high pressure pump operation is not required, and without flowing fuel from the high pressure pump outlet into the fuel rail, the high pressure pump may be cooled and lubricated without affecting the fuel rail pressure.

21 Claims, 8 Drawing Sheets

(56) References Cited

U.S. PATENT DOCUMENTS

| | | |
|---|---|---|
| 2003/0029423 A1 | 2/2003 | Boehland et al. |
| 2004/0154594 A1* | 8/2004 | Miyashita ............... 123/458 |
| 2008/0216797 A1* | 9/2008 | Oono ...................... 123/447 |
| 2008/0257304 A1 | 10/2008 | Noda et al. |
| 2009/0090331 A1* | 4/2009 | Pursifull .................. 123/446 |
| 2009/0159057 A1* | 6/2009 | Pursifull et al. .......... 123/575 |
| 2010/0108035 A1* | 5/2010 | Dusa et al. ............... 123/453 |
| 2011/0162724 A1* | 7/2011 | Kleckler ................. 137/115.23 |
| 2012/0048242 A1* | 3/2012 | Surnilla et al. ............ 123/497 |

\* cited by examiner

FUEL SYSTEM FOR A MULTI-FUEL ENGINE

BACKGROUND AND SUMMARY

Various fuel systems may be used to deliver a desired amount of fuel to an engine for combustion. One type of fuel system includes a port fuel injector and a direct injector for each engine cylinder. The port injectors may be operated during engine starting to improve fuel vaporization and reduce engine emissions. The direct injectors may be operated during higher load conditions to improve engine performance. In addition, both port injectors and direct injectors may be operated under some conditions to leverage advantages of both types of fuel delivery or differing fuels.

Direct injection fuel systems may include a high pressure fuel pump upstream of a fuel rail to raise a pressure of the fuel delivered to the engine cylinders through the direct injectors. However, when the high pressure fuel pump is turned off, such as when no direct injection of fuel is requested, pump durability may be affected. Specifically, the lubrication and cooling of the pump may be reduced while the high pressure pump is not operated, thereby leading to pump degradation.

Various approaches have been developed to reduce high pressure pump degradation. In one approach, as shown by Faix et al. in U.S. Pat. No. 6,230,688, a constant fuel lubrication flow quantity is branched off from the delivery flow of a low pressure pump coupled to a fuel tank, and delivered to a high pressure pump. However, the inventors herein have identified a potential issue with such an approach. The flow diversion and maintenance of a lubrication flow requires additional components which may add to operational costs.

Thus, in one example, the above issue may be at least partly addressed by a method of operating an engine fuel system including a first lower pressure fuel pump coupled upstream of a second higher pressure, positive-displacement fuel pump. In one embodiment, the method comprises, when second pump operation is not requested, operating the first pump to maintain a fuel rail pressure in the fuel rail while supplying fuel to an engine cylinder through an injector, and adjusting operation of the second pump to maintain an elevated pressure in a pump chamber of the second pump below the fuel rail pressure. In this way, lubrication and cooling of the higher pressure pump may be achieved using the available pump components, and without requiring additional components. As such, the above approach may be used with mechanical adjustments and additional components, such as those discussed in the above art, but may also be used in place of them.

In one example, an engine may include a first lower pressure pump configured to supply fuel from a fuel tank to an engine cylinder via a port injector, and a second higher pressure pump configured to receive fuel from the first pump, and supply fuel to the engine cylinder via a direct injector. The second pump may be a positive-displacement pump including a pumping chamber of varying volume. An inlet of the pumping chamber may be coupled to the lower pressure pump via an inlet check valve, and an outlet of the pumping chamber may be coupled to a fuel rail via an outlet check valve. During conditions when second pump operation is requested, such as when a fuel level in the fuel tank is higher than a threshold and direct injection of the fuel is requested, operation of the first and second pump may be adjusted and coordinated to maintain a desired fuel rail pressure while supplying fuel to the engine through the direct injector. In comparison, when second pump operation is not requested, such as when a fuel level in the fuel tank is lower than the threshold and/or direct injection of the fuel is not requested, operation of the first pump may be adjusted to maintain a desired fuel rail pressure to supply fuel to the engine via the port injector, while also enabling the second pump to be sufficiently filled with liquid fuel. Further, a stroke amount of the second pump may be adjusted (e.g., via pump duty cycle adjustments) to maintain a pressure in the pumping chamber of the second pump at or just below the fuel rail pressure. Specifically, the stroke amount may be adjusted so that a pressure in the pumping chamber (that is, on top of the pump piston), is large enough to drive fuel through the piston bore interface (to ensure lubrication), without affecting the fuel rail pressure or cylinder fuel injection. By maintaining a pressure in the pumping chamber (herein also referred to as the pumping chamber outlet pressure) of the second pump just below the fuel rail pressure, without allowing fuel to flow out of the outlet of the second pump into the fuel rail, the second pump may be kept lubricated, thereby reducing pump degradation.

As such, the outlet check valve may prevent fuel flow from the outlet of the second pump into the fuel rail as long as the pressure in the pumping chamber is maintained at or below the fuel rail pressure. To confirm that the pumping chamber outlet pressure is high enough to provide the desired level of lubrication, a stroke amount of the second pump may be occasionally pulsed, or intermittently increased, to allow a small amount of fuel to flow from the pumping chamber of the second pump into the fuel rail. If the pumping chamber outlet pressure is sufficiently high (that is, at the desired lubrication level), the adjusted stroke amount and related fuel flow into the fuel rail causes a corresponding increase in the fuel rail pressure. In response to the pulse in the fuel rail pressure, the stroke amount of the second pump is immediately decreased to a stroke amount that does not affect the fuel rail pressure.

In this way, during conditions when high pressure pump operation is not requested, by maintaining an elevated fuel pressure in the pumping chamber of the high pressure pump, without flowing fuel out of the pumping chamber into a fuel rail, fuel may be driven through the piston-bore interface of the pump to keep the pump sufficiently lubricated. By maintaining high pressure pump lubrication via adjustments to a stroke amount and duty cycle of the positive-displacement pump, pump lubrication may be achieved without necessitating additional components for flow diversion and flow control, although these may be included if desired. By reducing non-use of the high pressure pump, and maintaining high pressure pump lubrication and cooling, pump degradation may be reduced.

DETAILED DESCRIPTION

Figure 1:
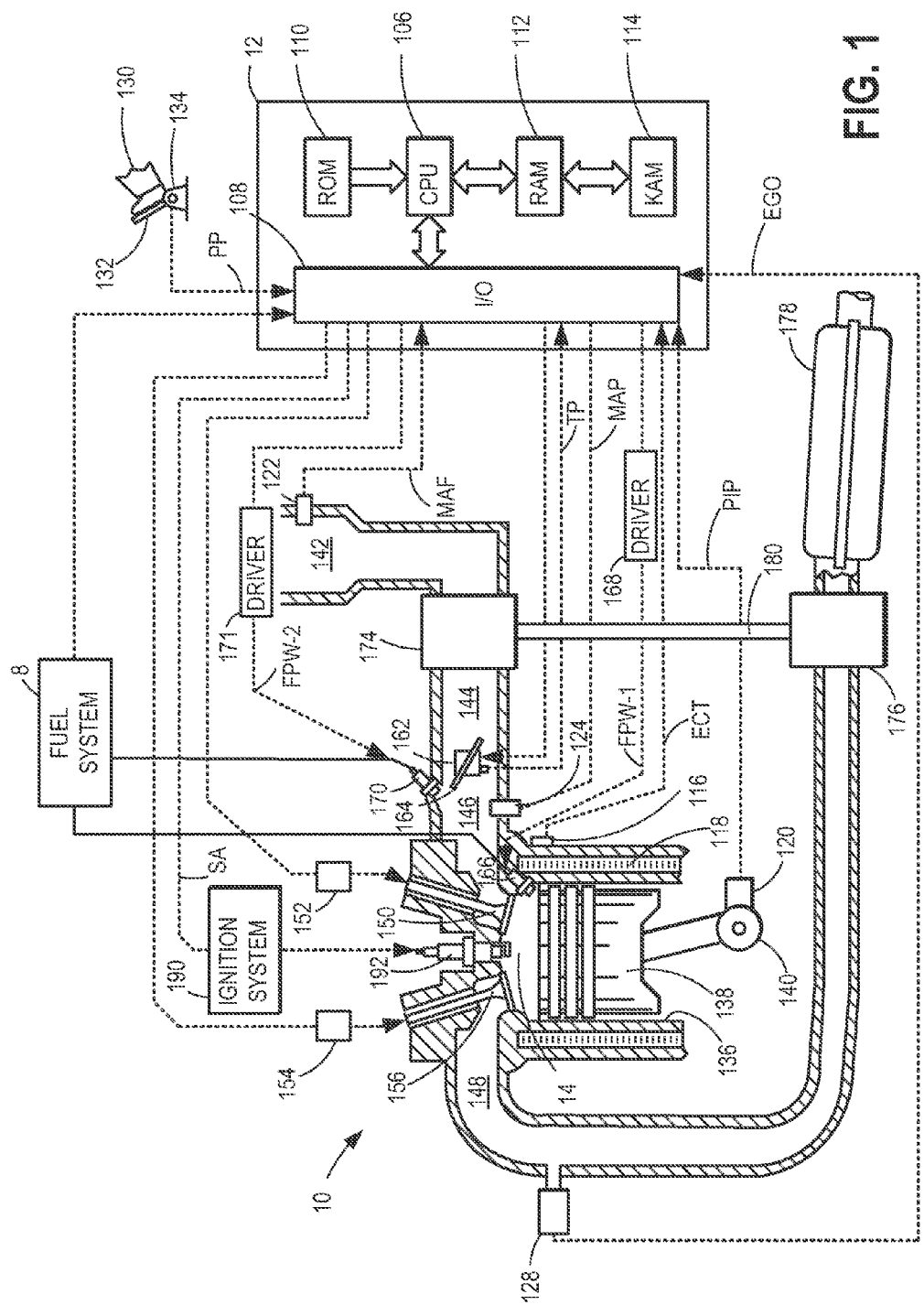
FIG. 1 schematically depicts an example embodiment of a cylinder of an internal combustion engine.
Figure 2:
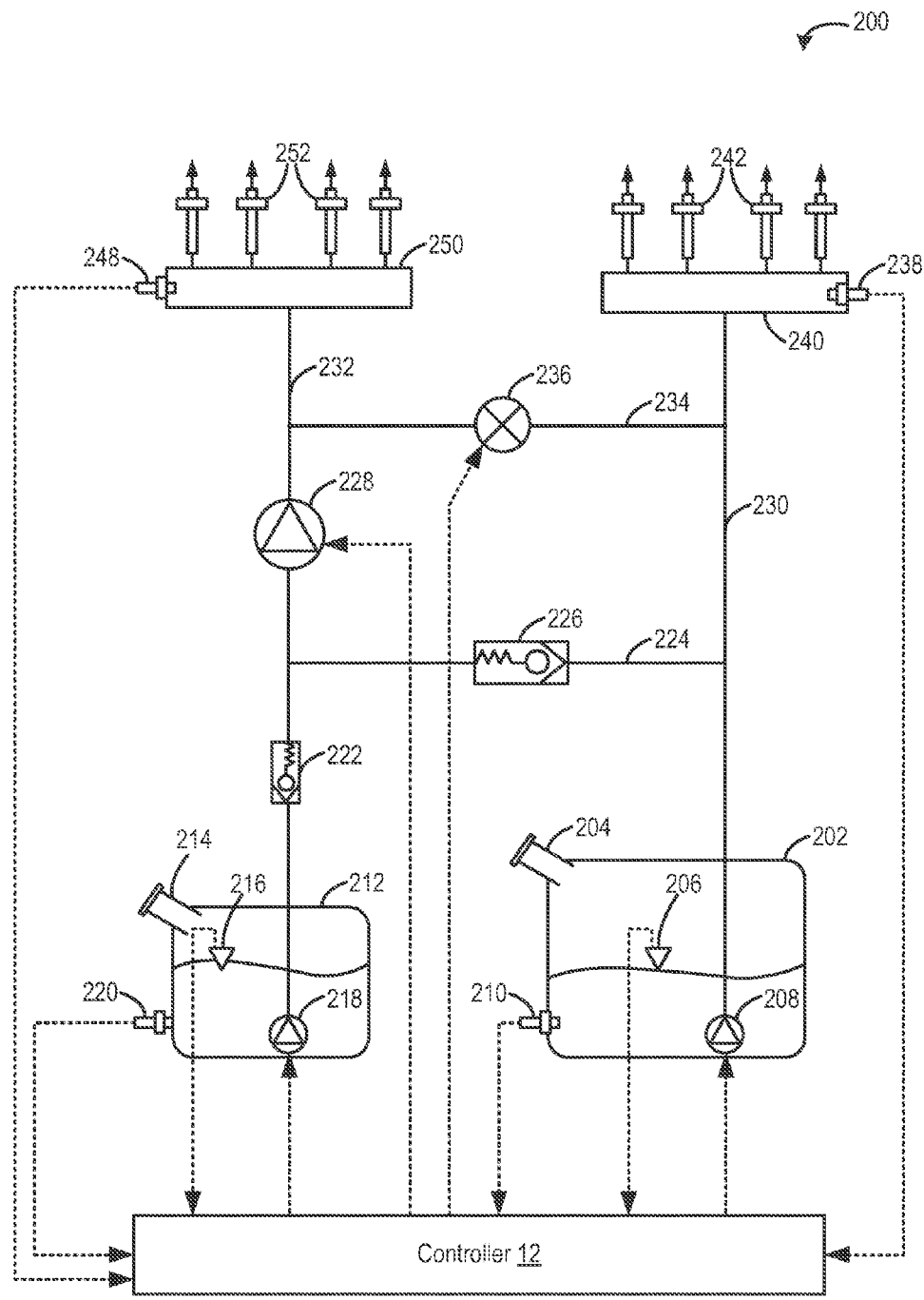
FIG. 2 schematically depicts an example embodiment of a fuel system that may be used with the engine of FIG. 1.
Figure 6:
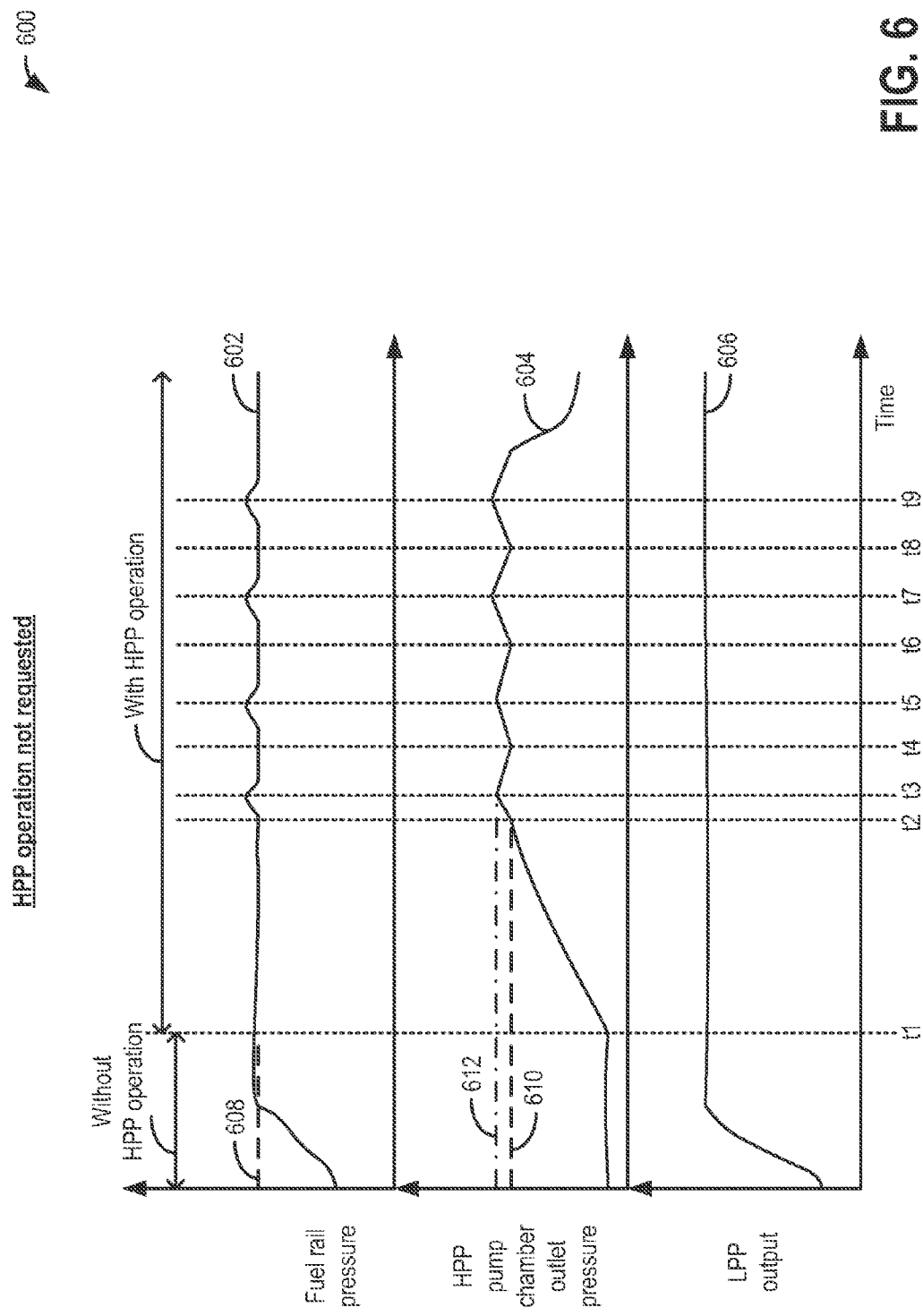
FIGS. 6-7 depict example adjustments in fuel system operation to enable lubrication and/or cooling of a high pressure fuel pump of the fuel system during conditions when high pressure pump operation is not requested.
Figure 7:
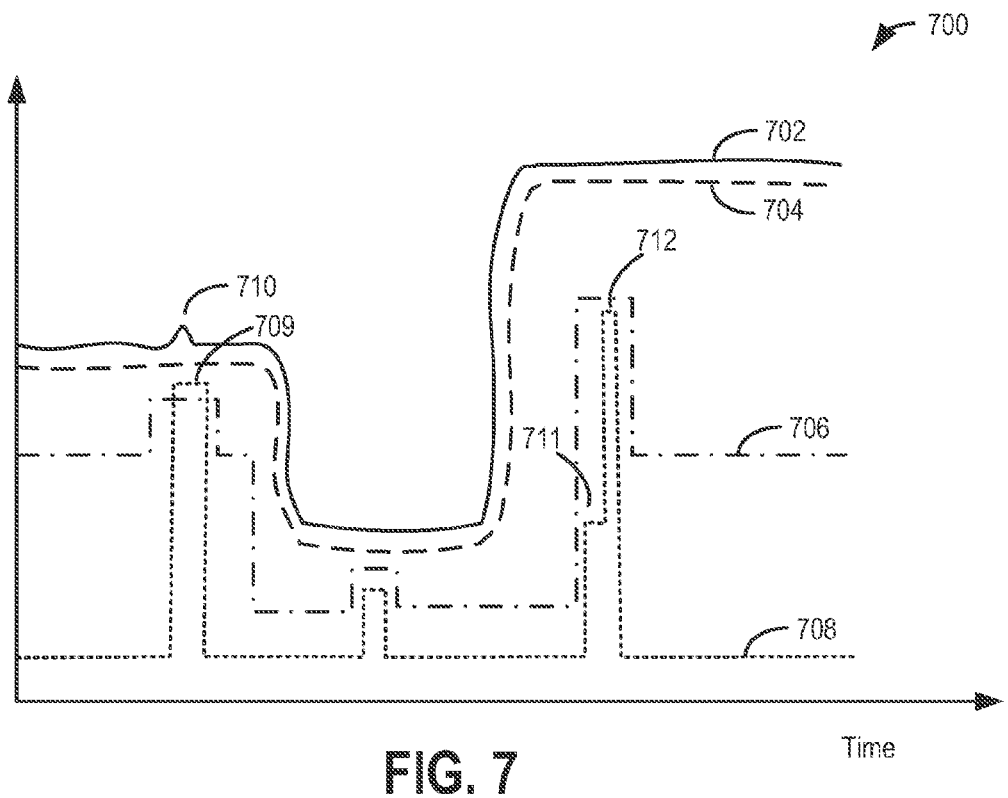
Figure 8:
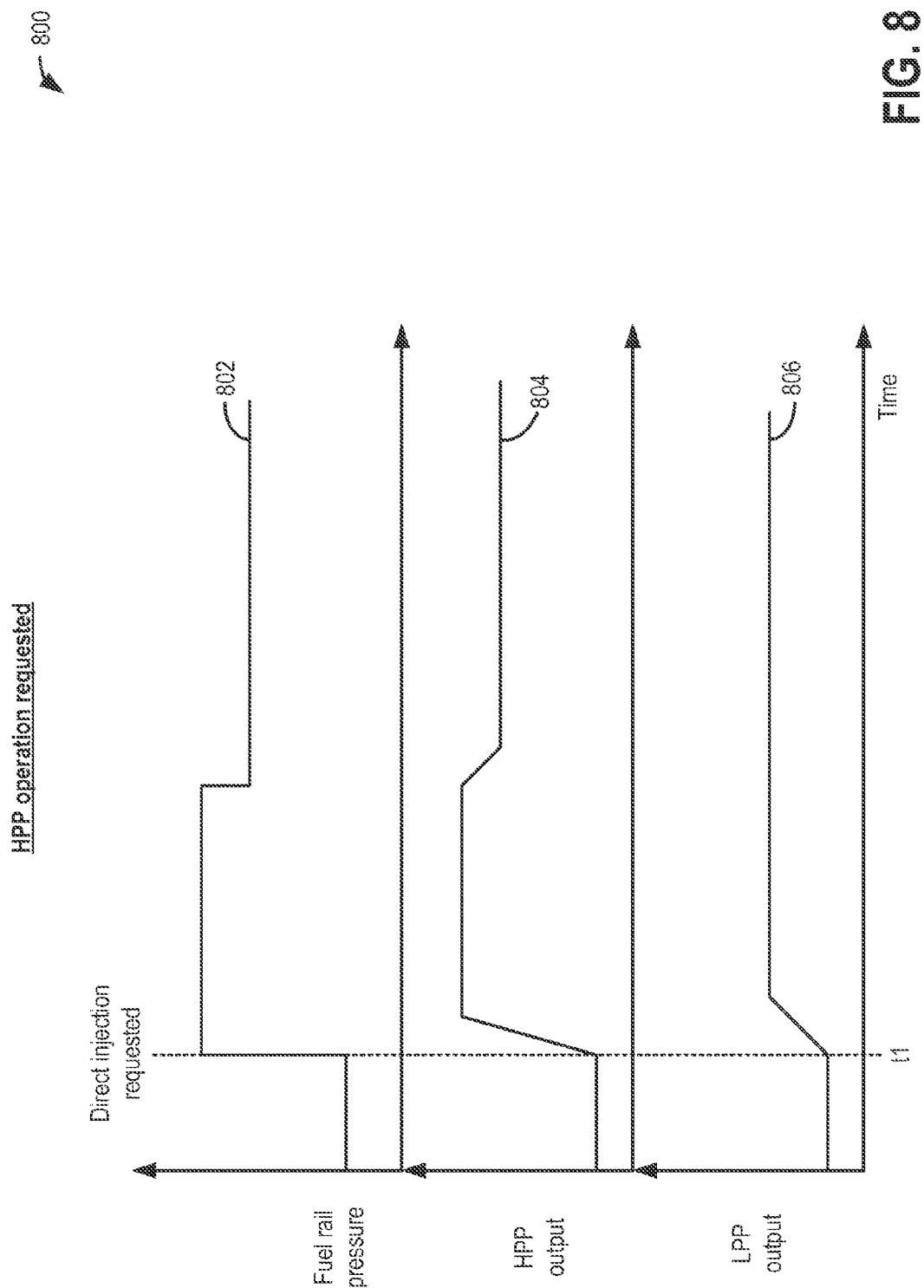
FIG. 8 depicts example adjustments in fuel system when high pressure pump operation is requested.

The following disclosure relates to methods and systems for operating a fuel system, such as the system of FIG. 2, configured to deliver one or more different fuel types to a combustion engine, such as the engine of FIG. 1. As shown in FIG. 2, the fuel system may include a first group of port injectors configured to port inject a selected fuel, and a second group of direct injectors configured to direct inject a selected fuel. A high pressure pump (FIG. 3) may be provided downstream of a low pressure pump for raising a pressure of the fuel to be direct injected. As such, during direct injection of fuel, the high pressure pump may be sufficiently lubricated (FIG. 8). However, during conditions when high pressure pump operation is not requested, an engine controller may maintain lubrication and/or cooling of the high pressure fuel pump by operating the low pressure pump to maintain a fuel rail pressure while adjusting a stroke amount of the high pressure pump to maintain a pump chamber outlet pressure of the high pressure pump just below the fuel rail pressure, as shown in FIGS. 6-7. The controller may be configured to perform one or more routines, such as those of FIGS. 4-5, to maintain the pump chamber outlet pressure of the high pressure pump just below the fuel rail pressure, and intermittently pulse the outlet pressure to monitor for corresponding changes in fuel rail pressure. In this way, by maintaining the pump chamber outlet pressure just below the fuel rail pressure, without flowing fuel into the fuel rail, the pump may be maintained sufficiently lubricated even when high pressure pump operation is not requested. As such, this improves pump reliability and reduces degradation of the high pressure pump.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor (not shown) may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8. As elaborated with reference to FIG. 2, fuel system 8 may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12. An example embodiment of fuel system 8 is further elaborated herein with reference to FIG. 2.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine.

As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel tanks in fuel system 8 may hold fuels of different fuel types, such as fuels with different fuel qualities and different fuel compositions. The differences may include different alcohol content, different water content, different octane, different heats of vaporization, different fuel blends, and/or combinations thereof etc. One example of fuels with different heats of vaporization could include gasoline as a first fuel type with a lower heat of vaporization and ethanol as a second fuel type with a greater heat of vaporization. In another example, the engine may use gasoline as a first fuel type and an alcohol containing fuel blend such as E85 (which is approximately 85% ethanol and 15% gasoline) or M85 (which is approximately 85% methanol and 15% gasoline) as a second fuel type. Other feasible substances include water, methanol, a mixture of alcohol and water, a mixture of water and methanol, a mixture of alcohols, etc.

In still another example, both fuels may be alcohol blends with varying alcohol composition wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

FIG. 2 schematically depicts an example embodiment 200 of the fuel system of FIG. 1. Fuel system 200 may be operated to deliver fuel to an engine, such as engine 10 of FIG. 1. Fuel system 200 may be operated by a controller to perform some or all of the operations described with reference to the process flow of FIGS. 4-5.

Fuel system 200 can provide fuel to an engine from one or more different fuel sources. As a non-limiting example, a first fuel tank 202 and a second fuel tank 212 may be provided. While fuel tanks 202 and 212 are described in the context of discrete vessels for storing fuel, it should be appreciated that these fuel tanks may instead be configured as a single fuel tank having separate fuel storage regions that are separated by a wall or other suitable membrane. Further still, in some embodiments, this membrane may be configured to selectively transfer select components of a fuel between the two or more fuel storage regions, thereby enabling a fuel mixture to be at least partially separated by the membrane into a first fuel type at the first fuel storage region and a second fuel type at the second fuel storage region.

In some examples, first fuel tank 202 may store fuel of a first fuel type while second fuel tank 212 may store fuel of a second fuel type, wherein the first and second fuel types are of differing composition. As a non-limiting example, the second fuel type contained in second fuel tank 212 may include a higher concentration of one or more components that provide the second fuel type with a greater relative knock suppressant capability than the first fuel.

By way of example, the first fuel and the second fuel may each include one or more hydrocarbon components, but the second fuel may also include a higher concentration of an alcohol component than the first fuel. Under some conditions, this alcohol component can provide knock suppression to the engine when delivered in a suitable amount relative to the first fuel, and may include any suitable alcohol such as ethanol, methanol, etc. Since alcohol can provide greater knock suppression than some hydrocarbon based fuels, such as gasoline and diesel, due to the increased latent heat of vaporization and charge cooling capacity of the alcohol, a fuel containing a higher concentration of an alcohol component can be selectively used to provide increased resistance to engine knock during select operating conditions.

As another example, the alcohol (e.g. methanol, ethanol) may have water added to it. As such, water reduces the alcohol fuel's flammability giving an increased flexibility in storing the fuel. Additionally, the water content's heat of vaporization enhances the ability of the alcohol fuel to act as a knock suppressant. Further still, the water content can reduce the fuel's overall cost.

As a specific non-limiting example, the first fuel type in the first fuel tank may include gasoline and the second fuel type in the second fuel tank may include ethanol. As another non-limiting example, the first fuel type may include gasoline and the second fuel type may include a mixture of gasoline and ethanol. In still other examples, the first fuel type and the second fuel type may each include gasoline and ethanol, whereby the second fuel type includes a higher concentration of the ethanol component than the first fuel (e.g., E10 as the first fuel type and E85 as the second fuel type). As yet another example, the second fuel type may have a relatively higher octane rating than the first fuel type, thereby making the second fuel a more effective knock suppressant than the first fuel. It should be appreciated that these examples should be considered non-limiting as other suitable fuels may be used that have relatively different knock suppression characteristics. In still other examples, each of the first and second fuel tanks may store the same fuel. While the depicted example illustrates two fuel tanks with two different fuel types, it will be appreciated that in alternate embodiments, only a single fuel tank with a single type of fuel may be present.

Fuel tanks 202 and 212 may differ in their fuel storage capacities. In the depicted example, where second fuel tank 212 stores a fuel with a higher knock suppressant capability, second fuel tank 212 may have a smaller fuel storage capacity than first fuel tank 202. However, it should be appreciated that in alternate embodiments, fuel tanks 202 and 212 may have the same fuel storage capacity.

Fuel may be provided to fuel tanks 202 and 212 via respective fuel filling passages 204 and 214. In one example, where the fuel tanks store different fuel types, fuel filling passages 204 and 214 may include fuel identification markings for identifying the type of fuel that is to be provided to the corresponding fuel tank.

A first low pressure fuel pump (LPP) 208 in communication with first fuel tank 202 may be operated to supply the first type of fuel from the first fuel tank 202 to a first group of port injectors 242, via a first fuel passage 230. In one example, first fuel pump 208 may be an electrically-powered lower pressure fuel pump disposed at least partially within first fuel tank 202. Fuel lifted by first fuel pump 208 may be supplied at a lower pressure into a first fuel rail 240 coupled to one or more fuel injectors of first group of port injectors 242 (herein also referred to as first injector group). While first fuel rail 240 is shown dispensing fuel to four fuel injectors of first injector group 242, it will be appreciated that first fuel rail 240 may dispense fuel to any suitable number of fuel injectors. As one example, first fuel rail 240 may dispense fuel to one fuel injector of first injector group 242 for each cylinder of the engine. Note that in other examples, first fuel passage 230 may provide fuel to the fuel injectors of first injector group 242 via two or more fuel rails. For example, where the engine cylinders are configured in a V-type configuration, two fuel rails may be used to distribute fuel from the first fuel passage to each of the fuel injectors of the first injector group.

First fuel pump 208 may be coupled upstream of a second high pressure fuel pump (HPP) 228 that is included in second fuel passage 232. In one example, second fuel pump 228 may be a mechanically-powered positive-displacement pump. Second fuel pump 228 may be in communication with a group of direct injectors 252 via a second fuel rail 250, and the group of port injectors 242 via a solenoid valve 236. Thus, lower pressure fuel lifted by first fuel pump 208 may be further pressurized by second fuel pump 228 so as to supply higher pressure fuel for direct injection to second fuel rail 250 coupled to one or more fuel injectors of second group of injectors 252 (herein also referred to as second injector group). In some embodiments, a fuel filter (not shown) may be disposed upstream of second fuel pump 228 to remove particulates from the fuel. Further, in some embodiments a fuel pressure accumulator (not shown) may be coupled downstream of the fuel filter, between the low pressure pump and the high pressure pump.

A third low pressure fuel pump 218 in communication with second fuel tank 212 may be operated to supply the second type of fuel from the second fuel tank 202 to the second group of direct injectors 252, via the second fuel passage 232. In this way, second fuel passage 232 fluidly couples each of the first fuel tank and the second fuel tank to the group of direct injectors. In one example, third fuel pump 218 may also be an electrically-powered low pressure fuel pump (LPP), disposed at least partially within second fuel tank 212. Thus, lower pressure fuel lifted by third fuel pump 218 may be further pressurized by higher pressure fuel pump 228 so as to supply higher pressure fuel for direct injection to second fuel rail 250 coupled to one or more fuel injectors of second group of injectors 252. In one embodiment, third fuel pump 218 and second fuel pump 228 can be operated to provide the second fuel type at a higher fuel pressure to second fuel rail 250 than the fuel pressure of the first fuel type that is provided to first fuel rail 240 by first fuel pump 208.

Fluid communication between first fuel passage 230 and second fuel passage 232 may be achieved through first and second bypass passages 224 and 234. Specifically, first bypass passage 224 may couple first fuel passage 230 to second fuel passage 232 upstream of second fuel pump 228, while second bypass passage 234 may couple first fuel passage 230 to second fuel passage 232 downstream of second fuel pump 228. One or more pressure relief valves may be included in the fuel passages and/or bypass passages to resist or inhibit fuel flow back into the fuel storage tanks. For example, a first pressure relief valve 226 may be provided in first bypass passage 224 to reduce or prevent back flow of fuel from second fuel passage 232 to first fuel passage 230 and first fuel tank 202. A second pressure relief valve 222 may be provided in second fuel passage 232 to reduce or prevent back flow of fuel from the first or second fuel passages into second fuel tank 212. In one example, lower pressure pumps 208 and 218 may have pressure relief valves integrated into the pumps. The integrated pressure relief valves may limit the pressure in the respective lift pump fuel lines. For example, a pressure relief valve integrated in first fuel pump 208 may limit the pressure that would otherwise be generated in first fuel rail 240 if solenoid valve 236 were (intentionally or unintentionally) open and while high pressure pump 228 were pumping.

In some embodiments, the first and/or second bypass passages may also be used to transfer fuel between fuel tanks 202 and 212. Fuel transfer may be facilitated by the inclusion of additional check valves, pressure relief valves, solenoid valves, and/or pumps in the first or second bypass passage, for example, solenoid valve 236. In still other embodiments, one of the fuel storage tanks may be arranged at a higher elevation than the other fuel storage tank, whereby fuel may be transferred from the higher fuel storage tank to the lower fuel storage tank via one or more of the bypass passages. In this way, fuel may be transferred between fuel storage tanks by gravity without necessarily requiring a fuel pump to facilitate the fuel transfer.

The various components of fuel system 200 communicate with an engine control system, such as controller 12. For example, controller 12 may receive an indication of operating conditions from various sensors associated with fuel system 200 in addition to the sensors previously described with reference to FIG. 1. The various inputs may include, for example, an indication of an amount of fuel stored in each of fuel storage tanks 202 and 212 via fuel level sensors 206 and 216, respectively. Controller 12 may also receive an indication of fuel composition from one or more fuel composition sensors, in addition to, or as an alternative to, an indication of a fuel composition that is inferred from an exhaust gas sensor (such as sensor 126 of FIG. 1). For example, an indication of fuel composition of fuel stored in fuel storage tanks 202 and 212 may be provided by fuel composition sensors 210 and 220, respectively. Additionally or alternatively, one or more fuel composition sensors may be provided at any suitable location along the fuel passages between the fuel storage tanks and their respective fuel injector groups. For example, fuel composition sensor 238 may be provided at first fuel rail 240 or along first fuel passage 230, and/or fuel composition sensor 248 may be provided at second fuel rail 250 or along second fuel passage 232. As a non-limiting example, the fuel composition sensors can provide controller 12 with an indication of a concentration of a knock suppressing component contained in the fuel or an indication of an octane rating of the fuel. For example, one or more of the fuel composition sensors may provide an indication of an alcohol content of the fuel.

Note that the relative location of the fuel composition sensors within the fuel delivery system can provide different advantages. For example, sensors 238 and 248, arranged at the fuel rails or along the fuel passages coupling the fuel injectors with one or more fuel storage tanks, can provide an indication of a resulting fuel composition where two or more different fuels are combined before being delivered to the engine. In contrast, sensors 210 and 220 may provide an indication of the fuel composition at the fuel storage tanks, which may differ from the composition of the fuel actually delivered to the engine.

Controller 12 can also control the operation of each of fuel pumps 208, 218, and 228 to adjust an amount, pressure, flow rate, etc., of a fuel delivered to the engine. As one example, controller 12 can vary a pressure setting, a pump stroke amount, a pump duty cycle command and/or fuel flow rate of the fuel pumps to deliver fuel to different locations of the fuel system. A driver (not shown) electronically coupled to controller 12 may be used to send a control signal to each of the low pressure pumps, as required, to adjust the output (e.g. speed) of the respective low pressure pump. The amount of first or second fuel type that is delivered to the group of direct injectors via the high pressure pump may be adjusted by adjusting and coordinating the output of the first or third LPP and the HPP. For example, the lower pressure fuel pump and the higher pressure fuel pump may be operated to maintain a prescribed fuel rail pressure. A fuel rail pressure sensor coupled to the second fuel rail may be configured to provide an estimate of the fuel pressure available at the group of direct injectors. Then, based on a difference between the estimated rail pressure and a desired rail pressure, the pump outputs may be adjusted. In one example, where the high pressure fuel pump is a volumetric displacement fuel pump, the controller may adjust a flow control valve of the high pressure pump to vary the effective pump volume of each pump stroke.

As such, while the higher pressure pump is operating, flow of fuel there-though ensures sufficient pump lubrication and cooling. However, during conditions when higher pressure pump operation is not requested, such as when no direct injection of fuel is requested, and/or when the fuel level in the second fuel tank 212 is below a threshold (that is, there is not enough knock-suppressing fuel available), the higher pressure pump may not be sufficiently lubricated if pump operation is discontinued. As elaborated in FIGS. 4-5, during such conditions, controller 12 may operate the first lower pressure fuel pump to maintain a fuel rail pressure in the first fuel rail while supplying fuel through the group of port injectors. At the same time, the controller may adjust a degree of operation (e.g., stroke amount) of the second higher pressure fuel pump to maintain a pressure at the outlet of the second pump just below the fuel rail pressure. Specifically, the controller may maintain a pressure in (and at the outlet of) a pumping chamber of the second pump just below the fuel rail pressure. In this way, the high pressure pump may be sufficiently lubricated without fuel flowing into the fuel rail and disturbing the fuel rail pressure.

Figure 3:
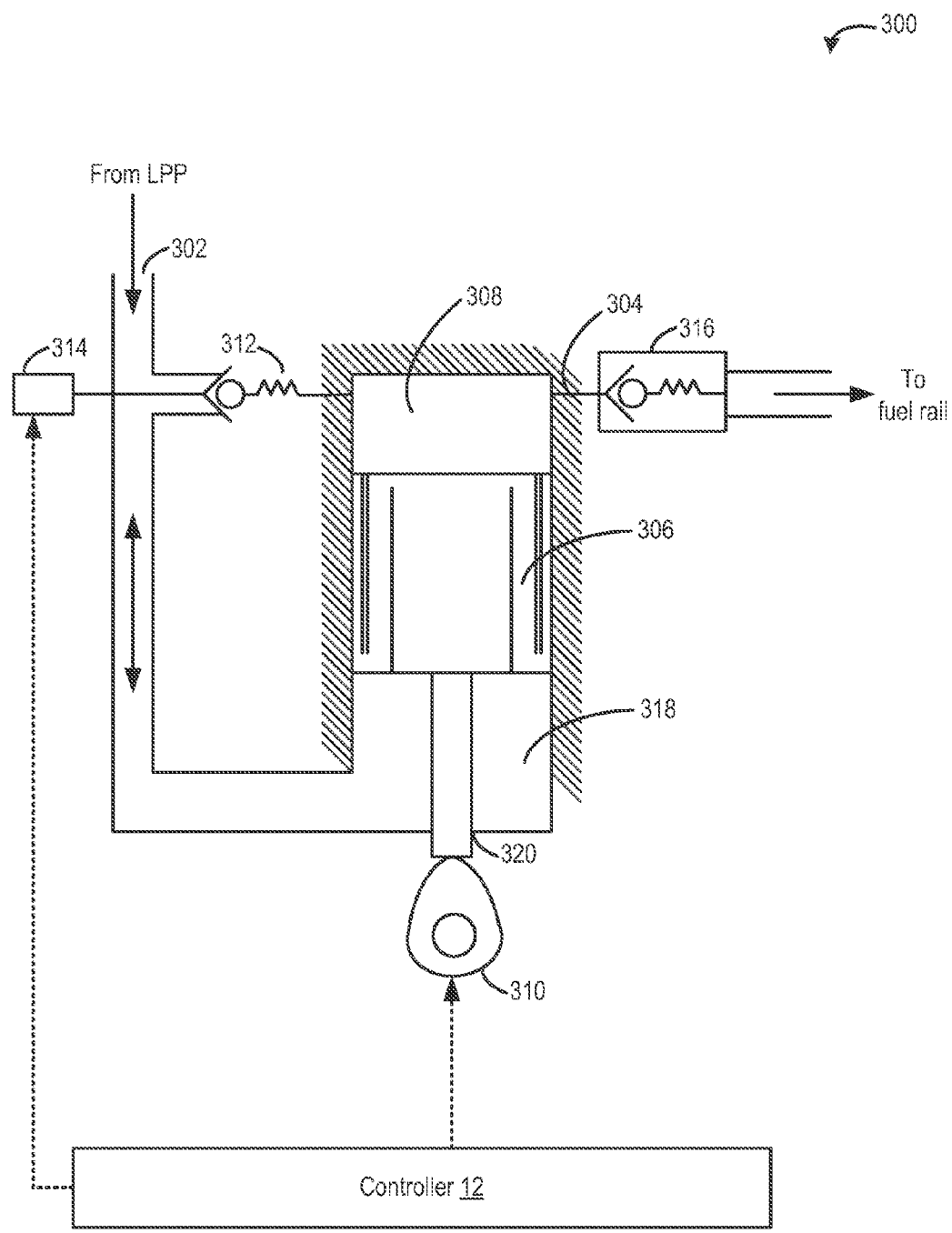
FIG. 3 depicts an example embodiment of a high pressure pump of the fuel system of FIG. 2.

FIG. 3 shows an example embodiment 300 of the high pressure pump of FIG. 2. High pressure pump (HPP) 300 may be configured to receive fuel from a low pressure pump (such as the first and third fuel lift pumps of FIG. 2) at pump inlet 302. The fuel may be pressurized upon passage though HPP 300 and supplied to a fuel rail through pump outlet 304. In the depicted example, HPP 300 may be a mechanically-driven displacement pump that includes a pump piston 306 and piston rod 320, a pump compression chamber 308 (herein also referred to as pump chamber), and a step-room 318. The step-room and pump chamber may include cavities positioned on opposing sides of the pump piston. In one example, engine controller 12 may be configured to adjust the position of piston 306 in HPP 300 by adjusting cam 310.

An adjustable forward flow inlet check valve 312 may be coupled to pump inlet 302. In one example, inlet check valve 312 may be an electronically actuated solenoid valve coupled to controller 12 via actuator 314. Controller 12 may be configured to regulate fuel flow through inlet check valve 312 by energizing or de-energizing the solenoid valve (based on the solenoid valve configuration). Accordingly, inlet check valve 312 may be operated in two modes. In a first mode, inlet check valve 312 is positioned within inlet 302 to limit (e.g. inhibit) the amount of fuel traveling upstream of the adjustable forward flow check valve. In comparison, in the second mode, inlet check valve 312 is effectively disabled and fuel can travel upstream and downstream of inlet check valve.

As such, pump inlet check valve 312 may be configured to regulate the mass of fuel compressed into the HPP. In one example, controller 12 may operate actuator 314 to adjust a closing timing of the inlet check valve to regulate the mass of fuel compressed. For example, a late inlet check valve closing may reduce the amount of fuel mass ingested into the pumping chamber. The inlet check valve opening and closing timings may be coordinated with respect to stroke timings of the HPP. By continuously throttling the flow into the HPP from the LPP, fuel may be ingested into the HPP without requiring metering of the fuel mass.

A forward flow outlet check valve 316 may be coupled downstream of an outlet 304 of the pump chamber 308 (herein also referred to as pump chamber outlet, or pump outlet 304). Outlet check valve 316 may be configured to open to allow fuel to flow from the pump chamber outlet 304 into a fuel rail only when a pressure at the outlet of HPP 300 (that is, a pump chamber outlet pressure) is higher than the fuel rail pressure. Thus, during conditions when HPP operation is not requested, controller 12 may operate inlet check valve 312 at a small duty cycle (based on the actuation of actuator 314) to build a peak pressure in the pump chamber with zero net flow out of the HPP. The controller may further adjust the stroke amount of HPP 300 so as to maintain a pressure at the HPP pump chamber outlet 304 within a threshold amount of the fuel rail pressure, but just below the fuel rail pressure. During such conditions, the fuel pressure in the pump chamber 308 exceeds the fuel pressure in the step room 318, and the pressure difference drives fuel down the piston-bore interface, thereby lubricating the pump. At the same time, outlet check valve 316 remains closed, and therefore no fuel flows out of the pump chamber of the HPP into the fuel rail. As a result, the second pump can be operated and lubricated without affecting the fuel rail pressure.

Thus, under these conditions, HPP may be operated to maintain pump cooling and lubrication without affecting fuel rail pressure, and the fuel rail pressure may be adjusted independent of the HPP operation by adjusting LPP output. To verify that the outlet pressure is at the lubrication-enabling level, and/or verify the operation of the outlet check valve 316, the controller may perform a closed-loop control by intermittently increasing the stroke amount of the HPP to raise the outlet pressure just above the fuel rail pressure. Alternatively, the controller may operator an open-loop duty cycle schedule (as elaborated in FIG. 5) wherein the inlet check valve is synchronously controlled to the pump chamber volume. For example, if the inlet valve is closed at the beginning of the HPP pump exhaust stroke, that is called a 100% duty cycle, and if the inlet valve closes halfway through the HPP pump stroke, that is referred to as a 50% duty cycle.

During the closed-loop control, the outlet check valve 316 may be temporarily opened and a small amount of fuel may flow into the fuel rail. The controller may monitor the fuel rail pressure to confirm that the temporary adjustment in HPP stroke amount results in a temporary increase in the fuel rail pressure, and then following the fuel flow, the controller may immediately decrease the stroke amount to return the HPP outlet pressure to a level wherein the fuel rail pressure returns to being not affected by the HPP operation. Example adjustments are illustrated herein with reference to FIGS. 6-7. In this way, pump lubrication may be better enabled and pump degradation may be reduced. Furthermore, the adjustments to HPP operation, performed during conditions when HPP operation is not requested, also reduce vapor formation in the pump's step-room 318, thereby improving HPP performance.

It will be appreciated that while the above description suggests maintaining an HPP outlet pressure, in alternate embodiments, a target maximum pressure may be maintained in pump compression chamber 308 to attain the desired HPP outlet pressure and level of pump lubrication.

In some embodiments (not depicted), a high pressure pump return line may be fluidly coupled downstream of the forward flow check valve and to the pump chamber. Fuel flow through the high pressure pump return line may be controlled by an electronically actuated valve. The high pressure pump return line serves either to limit fuel rail pressure or relieve fuel rail pressure upon electronic command.

One or more pressure sensors may be coupled to HPP 300. For example, a pressure sensor may be coupled to the inlet 302 of the high pressure pump. In some embodiments, the pressure measured at the inlet of the high pressure pump may be used to adjust the output of the lower pressure pump. During certain operating conditions, such as when the engine temperature is elevated, fuel may vaporize within the higher pressure pump. In particular, fuel within the step-room of the higher pressure pump may vaporize decreasing the lubrication or cooling within the higher pressure pump, thereby degrading operation of the pump and causing increased wear. The increased wear may lead to degradation of the pump during certain operating conditions, notably high pump speeds. The increased temperature may also lead to fuel vaporization at the inlet of the high pressure pump. Thus, in some embodiments, fuel vaporization at the inlet of the high pressure pump may be reduced by adjusting the operation of the LPP in response to pressure fluctuations at the inlet of the HPP. In one example, the amplitude of HPP inlet pressure pulsations, with a specified frequency range, may be indicative of vapor formation (e.g., higher amplitude indicative of less vapor formation). Thus, in response to the indication of vapor formation, an output of the LPP may be reduced to reduce the likelihood of further vapor formation in the fuel system.

Figure 4:
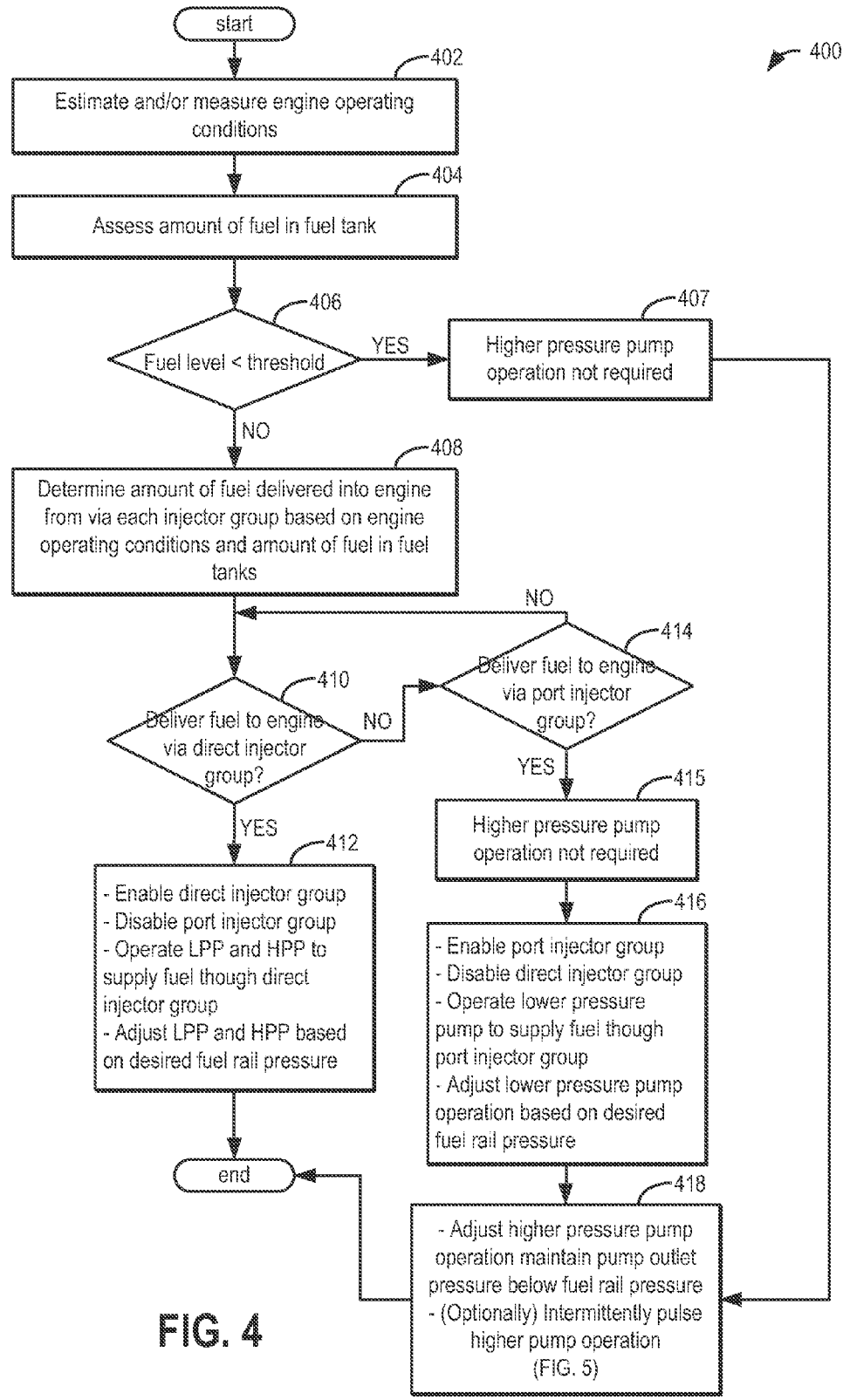
FIGS. 4-5 depict example high level flow charts for adjusting the operation of the fuel system of FIG. 2 to enable lubrication and/or cooling of a high pressure fuel pump, according to the present disclosure.

Now turning to FIG. 4, an example routine 400 is described for adjusting the operation of the low pressure and high pressure pumps of FIG. 2 to supply a desired amount of fuel to the engine while enabling pump lubrication.

At 402, engine operating conditions may be estimated and/or measured. These may include, for example, engine speed, boost, driver demanded torque, engine temperature, air charge, etc. At 404, an amount of fuel stored in each of the fuel tanks may be assessed. In one example, the amount of fuel stored in each tank may be assessed in response to input received from a fuel level sensor associated with each fuel tank (such as sensors 206 and 216 of FIG. 2). In alternate embodiments, the amount of fuel in each fuel tank may be inferred based on inputs received from other suitable sensors, including fuel mass sensors, fuel volume sensors, fuel pressure sensors, etc.

At 406, it may be determined whether the amount of fuel in the second fuel tank is below a threshold. In one example, the threshold may correspond to a minimum amount of fuel that may be direct injected through the group of direct injectors during engine operation. As one example, the fuel level may be determined based on the output of a fuel level sensor. Alternatively, the controller may infer the fuel level in the second fuel tank based on a fuel rail pressure (for example, a low fuel rail pressure may indicate an empty fuel tank). As yet another example, the controller may infer the fuel level in the second tank based on the pump pressure of the third low pressure fuel pump coupled to the second fuel tank (for example, a low lift pump pressure may indicate an empty fuel tank).

As such, when a sufficient amount of fuel is available in the second fuel tank for direct injection, and an amount of fuel is direct injected to the engine via the high pressure pump, the flow of fuel through the pump ensures high pressure pump lubrication and cooling. In comparison, when sufficient fuel is not available, the high pressure pump may degrade faster due to reduced lubrication and/or cooling. Thus, in response to a fuel level in the second fuel tank falling below a threshold at 406, at 407, it may be determined that HPP operation is not required (that is, direct injection of the second fuel type is not feasible), and the routine may proceed to 418 wherein appropriate steps, as elaborated below, may be taken to ensure lubrication and/or cooling of the fuel system's high pressure pump. Additionally, the third low pressure fuel pump coupled to the second fuel tank may be disabled.

While the depicted routine shows determining that HPP operation is not required in response to a fuel level in the second fuel tank being lower than a threshold, it will be appreciated that in alternate embodiments, the determining that HPP operation is not required may be in response to a fuel level in the first and second fuel tanks being lower than a threshold, the threshold for each fuel tank adjusted based on the fuel type. In still further embodiments, such as when the fuel system includes a single fuel tank, the routine may determine HPP operation based on the level of fuel in the given fuel tank.

If the amount of fuel is not below the threshold, that is, sufficient amount of fuel is available in the second fuel tank, then at 408, an amount of fuel to be delivered to the engine from each fuel tank via each injector group may be determined based on the estimated engine operating conditions, as well as the availability of fuels in the fuel tanks. As one example, this may include determining an amount of a first fuel to be delivered from the first fuel tank to the engine via the first injector group and/or an amount of second fuel to be delivered to from the second fuel tank to the engine via the second injector group. For example, where the first fuel type in the first fuel tank is gasoline and the second fuel type in the second fuel tank is E85, the controller may determine a first amount of gasoline to be port injected into the cylinder and/or a second amount of the ethanol fuel to be direct injected into the engine cylinder.

At 410, it may be determined whether fuel (of first or second fuel type) is to be delivered to the engine via the group of direct injectors. If yes, then at 412, the direct injector group may be enabled (to deliver the pumped fuel to the engine) while the port injector group is disabled. Based on whether the first or second (or both) types of fuel are to be direct injected, the first low pressure fuel pump coupled to the first fuel tank and/or the third low pressure fuel pump coupled to the second fuel tank may be operated to lift fuel from the respective tanks. Further, operation of the low pressure pump(s) and the high pressure pump may be adjusted to maintain a fuel rail pressure in the second fuel rail while injecting fuel into the engine's group of cylinders through the group of direct injectors. An example adjustment of HPP and LPP operation to enable direct injection is described herein with reference to FIG. 8.

If direct injection is not requested at 410, then at 414, it may be determined whether fuel (first or second type) is to be delivered to the engine via the group of port injectors. If yes, then at 415, as at 407, it may be determined that HPP operation is not required. At 416, in response to the request for port injection, the direct injector group may be disabled while the port injector group is enabled. Based on whether the first or second (or both) types of fuel are to be port injected, the first low pressure fuel pump coupled to the first fuel tank and/or the third low pressure fuel pump coupled to the second fuel tank may be operated to draw fuel from the respective tanks and supply fuel to the port injector group. Further, operation of the low pressure pump(s) may be adjusted responsive to a measured or estimated fuel rail pressure to maintain a desired fuel rail pressure in the first fuel rail while supplying fuel to engine cylinders via the group of port injectors.

To further ensure lubrication and cooling of the HPP during conditions when HPP operation is otherwise not requested, at 418, and as elaborated in FIG. 5, a degree of operation of the second fuel pump may be adjusted to maintain an elevated pressure in the pump chamber of, specifically at the pump chamber outlet of, the HPP within a threshold amount of, but below (e.g., just below) the fuel rail pressure. An example adjustment of HPP operation to enable HPP lubrication is described herein with reference to FIGS. 6-7.

It will be appreciated that in some examples, based on engine operating conditions, an amount of the second fuel type may be direct injected into the cylinder in addition to an amount of first fuel type being port injected into the cylinder. In such an embodiment, the first fuel pump and first port injector group may be enabled, in addition to the second and third fuel pumps and second direct injector group, to allow simultaneous port and direct injection.

Figure 5:
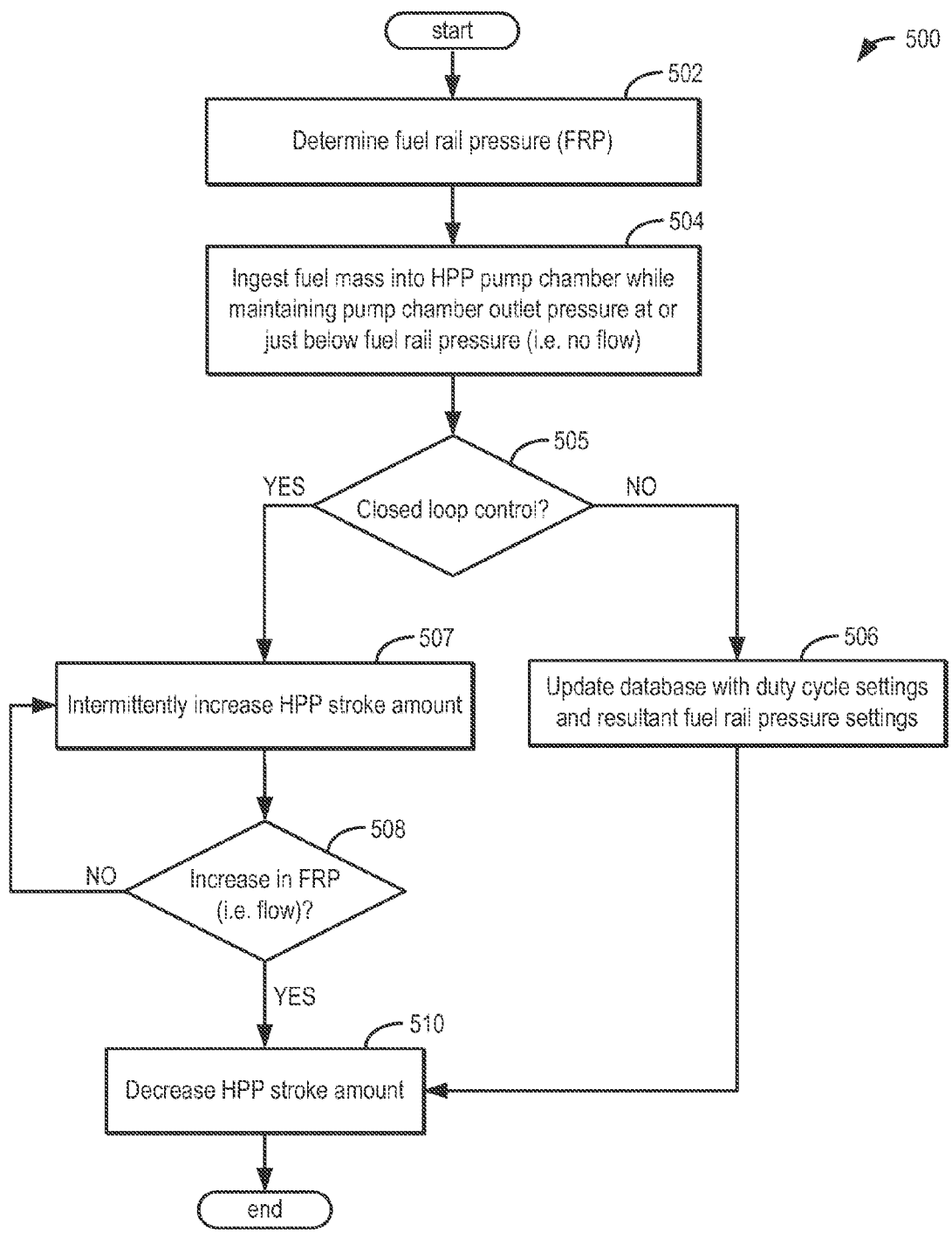

Now turning to FIG. 5, an example routine 500 is described for adjusting the degree of operation of the high pressure pump of FIG. 2 during conditions when high pressure pump operation is otherwise not required, to enable pump lubrication.

At 502, the fuel rail pressure may be estimated and/or measured. With reference to the fuel system of FIG. 2, the fuel rail pressure of the first fuel rail coupled to the group of port injectors may be determined. As such, during conditions when high pressure pump operation is not requested, and only port injection is requested, the low pressure pump(s) may be operated to maintain a fuel rail pressure in the first fuel rail while supplying fuel to the engine cylinders through the port injector. Thus, in response to the estimated fuel rail pressure in the fuel rail falling below the desired fuel rail pressure, the pump output (e.g., speed, flow, etc) of the low pressure pump may be increased.

At 504, a degree of operation of the high pressure pump may be adjusted to ingest a mass of fuel into the pump chamber of the HPP, and maintain a pressure at the pump chamber outlet at or just below the estimated fuel rail pressure. In one example, the adjustment includes adjusting an opening and/or closing timing (and/or duration of opening) of the HPP inlet check valve (herein also referred to as the duty cycle) to ingest the desired fuel mass and thereby adjust the stroke amount of the high pressure fuel pump to a greater and/or lesser stroke amount even when high pressure pump operation is not requested so as to maintain the pump chamber outlet pressure at an elevated level. As such, the stroke amount of the high pressure pump is adjusted responsive to the fuel rail pressure without flowing fuel from the outlet of the high pressure pump into the fuel rail. That is, without affecting the fuel rail pressure. By adjusting the stroke amount of the high pressure pump to maintain the pump chamber outlet pressure just below the fuel rail pressure, without flowing fuel into the fuel rail, the high pressure pump may be cooled and lubricated even when high pressure pump is not requested, thereby reducing pump degradation.

Duty cycle settings used to ingest the desired amount of fuel mass may be determined, by default, using an open-loop duty cycle schedule. As elaborated in FIG. 7, an engine controller may adjust the duty cycle command of the HPP to adjust the stroke amount. Since the duty cycle command is related to the pump displacement, the duty cycle commanded may be empirically mapped as a fraction of the pump's displacement volume. Duty cycle settings and the resulting terminal fuel rail pressures may be calibrated in advance and stored in a map (or look-up table) on the controller's database. The calibration process may include, for example, setting the duty cycle of the HPP to different values (e.g., 2%, 4%, 6%, etc.), and for each value, noting the resulting terminal fuel rail pressure, and then relieving the pressure by injecting. By relieving the pressure, an increase in the fuel rail pressure due to an increase in fuel temperature is reduced. Further, fuel system degradation can be indicated in response to a change in the map Duty cycle settings may also be recalibrated adaptively (that is, in-vehicle) responsive to settings used and terminal rail pressures attained on each pump cycle.

As such, when the commanded volume is a small fraction of the pump's displacement, the pumped volume does not get forced past the high pressure pump's outlet check valve due to the fuel's compliance (that is, bulk modulus). Thus, the duty cycle command can be adjusted to where the HPP has a positive pump chamber pressure but zero flow rate.

At 505, it may be determined whether additional closed-loop (feedback) control of the high pressure pump is desired. If additional closed-loop control is not requested, then at 506, the controller may update the duty cycle calibration table with the duty cycle settings applied and the resultant terminal fuel rail pressures achieved in the current pump operation cycle.

In comparison, if additional closed-loop control is requested, then at 507, the stroke amount of the high pressure pump may be intermittently increased. In one example, the high pressure pump may be (initially) operated at a first stroke amount while maintaining the pump chamber outlet pressure of the high pressure pump below the fuel rail pressure, and then intermittently, the stroke amount may be increased to a second, higher stroke amount until fuel is pushed from the pump chamber outlet of the high pressure pump into the fuel rail. As such, the first stroke amount corresponds to a stroke amount that does not affect the fuel rail pressure while the second, higher stroke amount corresponds to a stroke amount that does affect the fuel rail pressure.

At 508, the routine includes confirming that there is a temporary increase in the fuel rail pressure (that is, there is fuel flow into the fuel rail) responsive to the increase in pump stroke amount. If no increase is seen, then the routine may return to 507 to further increase the pump stroke amount. As such, if no effect is seen on the fuel rail pressure in response to the adjustment to the high pressure pump stroke amount, the controller determines that the pressure in the pump chamber of the high pressure pump is not high enough (and is not just below the fuel rail pressure) to provide sufficient pump lubrication level, and therefore increases the pump stroke amount by a predefined amount. If the fuel rail pressure does respond (i.e., is affected by) to the increased high pressure pump operation, then at 510, after fuel is pushed out of the pump chamber of the high pressure pump into the fuel rail, pump operation may be immediately decreased below the increased stroke amount, so that the fuel rail pressure no longer responds to (i.e., is independent of) the high pressure pump operation. With reference to the above-mentioned example, in response to fuel flow in to the fuel rail and a temporary increase in fuel rail pressure, the stroke amount may be decreased from the second stroke amount, for example, back to the first stroke amount (or an intermediate amount).

As previously indicated, the pump duty cycle command may be adjusted to provide a target pump compression chamber pressure (PCP) in place of a target HPP outlet pressure. For example, the controller may determine a target maximum PCP that can provide a desired pump lubrication. Herein, if there is high variation in maximum PCP versus the duty cycle command, a slightly higher fuel rail pressure will result and then flow past the outlet check valve will cease. In comparison, if there is a low variation in maximum PCP versus the duty cycle command, a slightly lower fuel rail pressure will result and flow will have already ceased. In this way, during conditions when HPP operation is not requested, fuel rail pressure can remain substantially unaffected even if there is some variation in PCP.

In this way, by intermittently operating the high pressure pump, it may be confirmed that the pump outlet pressure is within a threshold amount of, but just below, the fuel rail pressure, and that the fuel pump is sufficiently lubricated even when high pressure pump operation is not requested.

Now turning to FIG. 6, map 600 illustrates example adjustments to the operation of a lower pressure pump (LPP) and a higher pressure pump (HPP) during conditions when HPP operation is not requested. The LPP may be coupled upstream of the HPP in a fuel system, as shown in FIG. 2. Specifically, map 600 depicts changes in a HPP pump chamber outlet pressure at graph 604, changes in a LPP output at graph 606, and corresponding changes in a fuel rail pressure at graph 602. As such, the HPP pump chamber outlet pressure corresponds to the pressure present in the HPP pump chamber and upstream of the HPP outlet check valve.

In one example, as illustrated before t1, during conditions when HPP operation is not requested, the HPP may be disabled and operation of the pump may be discontinued ("without HPP operation"). However, the inventors herein have realized that the frequent disabling of the pump leads to insufficient cooling and lubrication of the pump, thereby expediting pump degradation. Thus, as illustrated before t1, by maintaining high pressure pump operation even when pump operation is otherwise not requested ("with HPP operation"), pump cooling and lubrication may be achieved without substantially affecting fuel rail pressure.

In the depicted example, based on engine operating conditions, a desired fuel rail pressure may be determined by a controller. During conditions when HPP operation is not requested, the engine controller may operate the LPP, and adjust (e.g., increase) an output of the LPP responsive to an estimated fuel rail pressure, to maintain the desired fuel rail pressure in the fuel rail, while injecting fuel into an engine cylinder (for example, via port injection). Thus, as seen before t1, in response to an increase in the output of the LPP (graph 606), the fuel rail pressure may be raised (graph 602) to the desired fuel rail pressure 608.

While the LPP output is maintained, between t1 and t2, a stroke amount of the HPP is adjusted (e.g., increased, as depicted) responsive to the fuel rail pressure to raise and maintain a pump chamber outlet pressure of the HPP (graph 604) within a threshold amount of, but below, the desired fuel rail pressure 608. For example, the HPP stroke amount may be increased (via adjustments in pump duty cycle settings) to a first stroke amount that raises the HPP pump chamber outlet pressure to a first outlet pressure 610. As such, the adjustment of the HPP to the first stroke amount and first outlet pressure enables the HPP to be sufficiently lubricated without affecting the fuel rail pressure in the fuel rail, and without flowing fuel into the fuel rail.

After t2, the controller may be configured to intermittently pulse the HPP stroke amount to thereby intermittently flow fuel from the pump chamber outlet of the HPP into the fuel rail. The resultant intermittent pulsing of the HPP pump chamber outlet pressure (graph 604) leads to a corresponding pulse in the fuel rail pressure (graph 602). For example, as shown at t2, t4, t6, and t8, the HPP stroke amount may be intermittently increased from the first stroke amount to a second stroke amount that raises the HPP pump chamber outlet pressure from the first outlet pressure 610 to a second outlet pressure 612. The second outlet pressure 612 may be set to be higher than (e.g., just above) the fuel rail pressure such that a check valve downstream of the pump chamber outlet of the HPP is temporarily opened and an amount of fuel can flow from the pump chamber outlet of the HPP into the fuel rail. That is, the adjustment of the HPP to the second stroke amount and second outlet pressure affects the fuel rail pressure, and this change in fuel rail pressure is monitored by the controller. Following fuel flow into the fuel rail (as determined by the temporary increase in fuel rail pressure), the controller may immediately decrease the HPP stroke amount to below the increased HPP stroke amount. For example, as shown at t3, t5, t7, and t9, the HPP stroke amount may be immediately decreased from the second stroke amount to the first stroke amount to lower the HPP pump chamber outlet pressure from the second outlet pressure 612 to the first outlet pressure 610.

In this way, by intermittently adjusting HPP operation to temporarily affect fuel rail pressure, it may be confirmed that the fuel pressure in the HPP pump chamber is high enough to enable sufficient lubrication at the piston-bore interface.

In comparison, FIG. 8 illustrates example adjustments to the operation of the LPP and the HPP during conditions when high pressure pump operation is requested. Specifically, map 800 depicts a desired fuel rail pressure based on engine operating conditions at graph 802, and corresponding adjustments to a HPP output at graph 804, and adjustments to a LPP output at graph 806.

In the depicted example, in response to a request for direct injection of fuel at t1, LPP operation may be increased to lift fuel from the fuel tank. As such, the LPP may be configured to supply fuel from the fuel tank to a group of port injectors directly (for port injection), while HPP is configured to receive fuel from the fuel tank via the LPP and supply the received fuel to a group of direct injectors (for direct injection). Thus, when HPP operation is requested (at t1), a controller may adjust and coordinate operation of the LPP and the HPP to maintain a desired fuel rail pressure in the common fuel rail of the direct injectors, while injecting fuel into an engine cylinder.

As illustrated, at t1, LPP output may be increased to allow fuel to be lifted. Then, the LPP output may be maintained at a level that allows a constant supply of fuel to be provided (at a desired flow rate) to the HPP. Also at t1, HPP output may be increased to allow the HPP to pressurize the fuel received from the LPP and supply it to the injectors at the desired fuel rail pressure. Thus, the HPP output may be adjusted responsive to the desired fuel rail pressure, and may thus follow similar trends, while the LPP output remains substantially constant while direct injection is requested.

Now turning to FIG. 7, it illustrates another example adjustment to the operation of an LPP and an HPP during conditions when HPP operation is not requested. Herein, the adjustments are shown as the desired fuel rail pressure changes. Specifically, map 700 depicts fuel rail pressure at graph 702 (solid line), an LPP output pressure at graph 704 (dashed line), a desired HPP pump chamber outlet pressure at graph 706 (dashed and dotted line), and changes in an HPP duty cycle at graph 708 (small dashed line).

As illustrated, when HPP operation is not requested, the LPP may be operated responsive to the fuel rail pressure to maintain a desired fuel rail pressure in the fuel rail while supplying fuel to a group on engine cylinders through a group of port injectors. Thus, when the desired fuel rail pressure (graph 702) increases or decreases (based on engine operating conditions), the LPP output pressure (graph 704) correspondingly increases or decreases. A controller may also adjust a desired pump chamber outlet pressure of the HPP (graph 706) based on the desired fuel rail pressure such that the pump chamber outlet pressure is always within a threshold amount of (but below) the fuel rail pressure. In particular, the controller may adjust the duty cycle (graph 708) of the HPP to thereby adjust a stroke amount of the HPP and change the pressure in the HPP pump chamber and at the HPP pump chamber outlet (that is, the HPP pump chamber outlet pressure).

Figure 9:
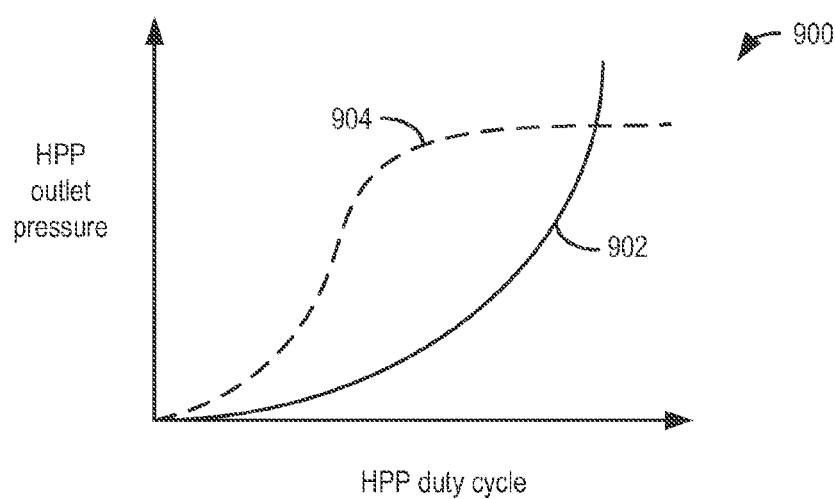
FIG. 9 depicts an example relationship between a high pressure pump duty cycle command and the pump's outlet pressure during conditions of flow and no-flow.

As such, the fuel mass ingested into the HPP pump chamber, and the resulting pump chamber outlet pressure of the HPP may be a function of the HPP's duty cycle. Further, the function may vary based on whether flow is desired out of the HPP (such as when HPP operation is requested) or whether no-flow is desired (such as when HPP operation is not requested). The function may be linear, affine, sigmoidal, exponential, or another function. FIG. 9 shows map 900 with a non-limiting example of relationships between an HPP duty cycle and the HPP outlet pressure during flow conditions (line 902, solid line) and no-flow conditions (line 904, dashed line).

Returning to FIG. 7, based on the desired HPP pump chamber outlet pressure, the controller may vary the duty cycle of the HPP to thereby attain a target maximum pump chamber pressure and the desired HPP pump chamber outlet pressure that enables sufficient HPP lubrication. The controller may also adjust the duty cycle (as shown at 709) to intermittently raise the pump chamber outlet pressure beyond the desired outlet pressure. The controller may then look for a pulse in the fuel rail pressure (shown at 710) corresponding to the pulse in HPP pump chamber outlet pressure to confirm that the actual HPP pump chamber outlet pressure is where it is desired.

In response to an increase in desired fuel rail pressure, and a corresponding increase in desired HPP pump chamber outlet pressure, the controller may adjust the duty cycle (as shown at 711) to raise the HPP pump chamber outlet pressure. However, during some conditions, the initial duty cycle adjustment may not be sufficient to raise the HPP pump chamber outlet pressure to the desired level. In such an event, the controller may further adjust the duty cycle to further increase the HPP pump chamber outlet pressure (as shown at 712).

In one example, a fuel system may include a first fuel tank storing a first fuel type, a group of port fuel injectors in communication with a group cylinders, a group of direct injectors in communication with the group of cylinders and a first low pressure fuel pump coupled to the first fuel tank. The first fuel pump may be positioned upstream of a second high pressure fuel pump. The first fuel pump may be in communication with the group of port fuel injectors via a first fuel rail. The second fuel pump may be in communication with the group of port fuel injectors via a solenoid valve, and in further communication with the group of direct injectors via a second fuel rail. When second fuel pump operation is not requested, a controller may be configured with code to execute instructions that enable the controller to operate the first fuel pump to maintain a first fuel rail pressure in the first fuel rail while supplying the first fuel type to the group of cylinders through the group of port injectors. The controller may also adjust operation of the second fuel pump to maintain an amount of fuel in the pump chamber of the second pump and maintain the pump chamber outlet pressure of the second fuel pump below the first fuel rail pressure. For example, the controller may maintain a pump chamber outlet pressure of the second fuel pump below the first fuel rail pressure by adjusting a stroke amount and/or duty cycle of the second fuel pump responsive to the first fuel rail pressure to maintain the pump chamber outlet pressure of the second fuel pump below the first fuel rail pressure. Then, to confirm that the outlet pressure is elevated enough to enable sufficient pump lubrication, the controller may intermittently increase the stroke amount or duty cycle of the second pump to flow fuel from the outlet of the second fuel pump's pump chamber into the first fuel rail. Upon fuel flow into the first fuel rail, the controller may immediately decrease the stroke amount to below the increased stroke amount, to return the high pressure pump to an operation state that does not affect the fuel rail pressure.

The fuel system may further include a second fuel tank storing a second fuel type, and a third low pressure pump coupled to the second fuel tank, and positioned upstream of the second high pressure pump. As such, second fuel pump operation may not be requested when direct injection is not requested and/or a fuel level in the second fuel tank is below a threshold level. When second fuel pump operation is requested, the controller may adjust the operation of the second fuel pump and at least one of the first and third fuel pumps (based on which fuel is to be direct injected into the cylinder) to maintain a second fuel rail pressure in the second fuel rail while supplying at least one of the first and second fuel to the group of cylinders through the group of direct injectors.

In this way, by enabling operation of a fuel system high pressure pump to maintain a peak pumping chamber pressure elevated enough to maintain pump lubrication but lower than the fuel rail pressure so as not to affect fuel rail pressures, pump degradation may be reduced without requiring additional hardware to ensure pump lubrication.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a fuel system including a first fuel pump coupled upstream of a second, positive-displacement fuel pump, comprising, when second fuel pump operation is not requested,
   operating the first fuel pump to maintain a fuel rail pressure at a fuel rail while supplying fuel to an engine cylinder through an injector; and
   adjusting a flow control valve to vary an effective pump volume of each pump stroke of the second fuel pump to maintain an elevated pressure in a pump chamber of the second fuel pump below the fuel rail pressure and without affecting fuel rail pressure.

2. The method of claim 1, wherein the first fuel pump is a lower pressure fuel pump and the second fuel pump is a higher pressure fuel pump.

3. The method of claim 2, wherein the first fuel pump is electrically-powered and the second fuel pump is mechanically-powered.

4. The method of claim 1, wherein adjusting the flow control valve pump includes adjusting a stroke amount of the second fuel pump to a greater and lesser stroke amount even when second fuel pump operation is not requested.

5. The method of claim 4, wherein the stroke amount of the second fuel pump is adjusted responsive to fuel rail pressure, without flowing fuel from a pump chamber outlet of the second fuel pump to the fuel rail.

6. The method of claim 1, wherein adjusting the flow control valve includes intermittently operating the second fuel pump.

7. The method of claim 1, wherein direct fuel injection is deactivated, and wherein adjusting the flow control valve includes operating the second fuel pump at a first stroke amount while maintaining a pump chamber outlet pressure of the second fuel pump below the fuel rail pressure, and then intermittently increasing second fuel pump operation to a second, higher stroke amount until fuel is pushed from the pump chamber outlet of the second fuel pump into the fuel rail.

8. The method of claim 7, wherein intermittently increasing second fuel pump operation includes intermittently increasing the stroke amount of the second fuel pump until fuel rail pressure responds to the increased second fuel pump operation, and then decreasing operation of the second fuel pump so that the fuel rail pressure no longer responds to operation of the second fuel pump.

9. The method of claim 8, further comprising, after fuel is pushed out, immediately decreasing second fuel pump operation to below the second stroke amount.

10. The method of claim 1, wherein the fuel system further includes a fuel tank coupled to the first and second fuel pumps, and wherein second fuel pump operation is not requested when a fuel level in the fuel tank is below a threshold level.

11. A method of operating a fuel system including a low pressure fuel pump (LPP) coupled upstream of a high pressure fuel pump (HPP), comprising, when HPP operation is not requested,
operating the LPP to maintain a fuel rail pressure in a fuel rail while injecting fuel into an engine cylinder;
ingesting fuel into the HPP and adjusting a stroke amount of the HPP responsive to the fuel rail pressure to maintain a pump chamber outlet pressure of the HPP within a threshold pressure, but below the fuel rail pressure; and
intermittently pulsing the HPP stroke amount to intermittently flow fuel from an outlet of the HPP into the fuel rail.

12. The method of claim 11, wherein intermittently pulsing the HPP stroke amount includes intermittently pulsing the HPP pump chamber outlet pressure to correspondingly pulse the fuel rail pressure.

13. The method of claim 11, wherein the intermittent pulsing includes:
intermittently increasing the HPP stroke amount to flow fuel from the pump chamber outlet of the HPP into the fuel rail; and
after fuel flow into the fuel rail, immediately decreasing the HPP stroke amount to below the increased HPP stroke amount.

14. The method of claim 11, wherein the fuel system includes a fuel tank and wherein the LPP is configured to supply fuel from the fuel tank to a first group of port injectors in the engine cylinder, and wherein the HPP is configured to receive fuel from the fuel tank via the LPP, and supply the received fuel to a second group of direct injectors in the engine cylinder.

15. The method of claim 14, wherein HPP operation is not requested when a fuel level in the fuel tank is below a threshold.

16. The method of claim 11, further comprising,
when HPP operation is requested,
adjusting operation of the LPP and the HPP to maintain the fuel rail pressure in the fuel rail while injecting fuel into the engine cylinder.

17. The method of claim 16, further comprising, adjusting operation of the LPP in response to pressure fluctuations at an inlet of the HPP.

18. A fuel system for an internal combustion engine, comprising:
a first fuel tank storing a first fuel type;
a group of port fuel injectors in communication with a group of cylinders;
a group of direct injectors in communication with the group of cylinders;
a first low pressure fuel pump coupled to the first fuel tank and positioned upstream of a second high pressure fuel pump, the first fuel pump in communication with the group of port fuel injectors via a first fuel rail, the second high pressure fuel pump in communication with the group of port fuel injectors via a solenoid valve, the second high pressure fuel pump further communicating with the group of direct injectors via a second fuel rail; and
a control system configured with instructions for:
when second high pressure fuel pump operation is not requested,
operating the first low pressure fuel pump to maintain a first fuel rail pressure in the first fuel rail while supplying the first fuel type to the group of cylinders through the group of port fuel injectors; and
ingesting fuel into the second fuel pump and adjusting operation of the second high pressure fuel pump to maintain an elevated pressure in a pump chamber of the second high pressure fuel pump below the first fuel rail pressure and without affecting fuel rail pressure.

19. The system of claim 18, wherein adjusting operation of the second fuel pump to maintain an elevated pressure in the pump chamber of the second high pressure fuel pump below the first fuel rail pressure includes,
adjusting a stroke amount of the second high pressure fuel pump responsive to the first fuel rail pressure to maintain the pump chamber pressure of the second high pressure fuel pump below the first fuel rail pressure;
intermittently increasing the stroke amount to flow fuel from an outlet of the second high pressure fuel pump into the first fuel rail; and
after fuel flow into the first fuel rail, immediately decreasing the stroke amount to below the increased stroke amount.

20. The system of claim 19, further comprising a second fuel tank storing a second fuel type, and a third low pressure pump coupled to the second fuel tank, the third low pressure pump also positioned upstream of the second high pressure fuel pump, wherein second high pressure fuel pump operation is not requested when a fuel level in the second fuel tank is below a threshold level.

21. The system of claim 20, further comprising,
when second high pressure fuel pump operation is requested,
adjusting operation of the second high pressure fuel pump and at least one of the first and third fuel pumps to maintain a second fuel rail pressure in the second fuel rail while supplying at least one of the first and second fuel types to the group of cylinders through the group of direct injectors.

* * * * *